No. 635,915. Patented Oct. 31, 1899.
D. B. CAMP.
VALVE FOR BICYCLE TIRES.
(Application filed Sept. 10, 1898.)
(No Model.)

WITNESSES: A. R. Krausse. Russell M. Everett.

INVENTOR Daniel B. Camp,
BY Drake & Co.
ATTORNEYS.

UNITED STATES PATENT OFFICE.

DANIEL B. CAMP, OF MONTCLAIR, NEW JERSEY.

VALVE FOR BICYCLE-TIRES.

SPECIFICATION forming part of Letters Patent No. 635,915, dated October 31, 1899.

Application filed September 10, 1898. Serial No. 690,678. (No model.)

*To all whom it may concern:*

Be it known that I, DANIEL B. CAMP, a citizen of the United States, residing at Montclair, in the county of Essex and State of New Jersey, have invented certain new and useful Improvements in Valves for Bicycle-Tires, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a pneumatic valve for bicycle-tires, &c., which will be less liable to become clogged or otherwise obstructed in its operations while in service, to secure a valve that will more effectually prevent the escape of air from the tire, and to secure other advantages and results, some of which may be referred to in connection with the description of the working parts.

The invention consists in the improved valve for pneumatic tires, &c., and in the arrangements and combinations of parts of the same, all substantially as will be hereinafter set forth, and finally embraced in the clauses of the claim.

Figure 1:
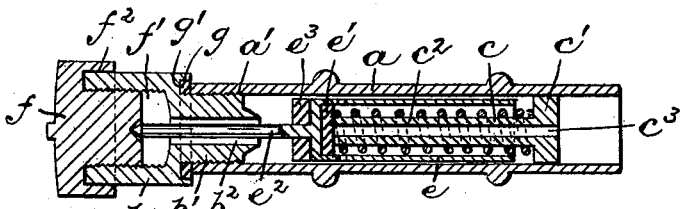
Figure 2:
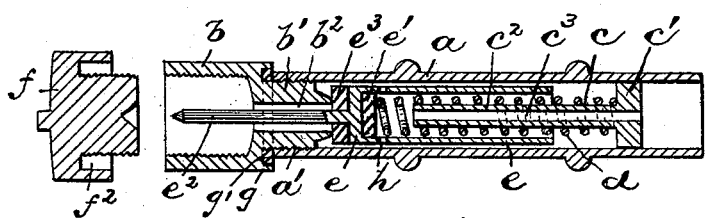
Figures 3, 4:
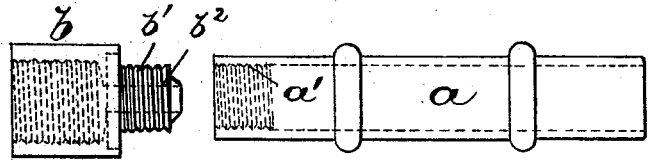
Figures 5, 6:
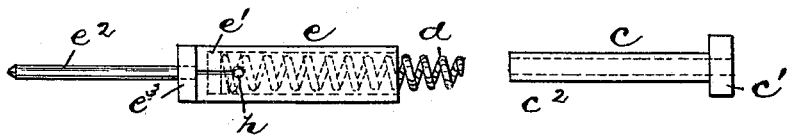

Referring to the accompanying drawings, in which like letters of reference indicate corresponding parts in each of the several views, Figure 1 is a central longitudinal section of my improved valve detached from the tire and showing the cover or cap at its outer end in closed position. Fig. 2 is a similar section showing the cap removed. Figs. 3 and 4 are side elevations in detail of a certain plug and a valve-cylinder, respectively; and Figs. 5 and 6 show parts of the valve, as will be hereinafter fully explained.

In said drawings, $a$ indicates the outer cylinder, adapted to be inserted in and fastened to the tire in any ordinary manner. At the outer end of the said cylinder the same is provided with a female thread $a'$, adapted to receive the reduced portion $b'$ of the plug $b$, said reduced portion being threaded in correspondence with the threads of the said cylinder. The interior of the said cylinder in from the threaded portion forms a receptacle for the valve.

At or near the end of the cylinder opposite that having the threads $a'$ I have formed or secured a valve-seat $c$, comprising a head $c'$, which may be soldered or brazed to the cylinder $a$ or may be formed integral therewith, and a reduced tubular extension $c^2$, which extends longitudinally through the middle of said receptacle toward the outer end, as shown in Figs. 1 and 2. Said extension $c^2$ serves as a seat or support for a spring $d$, the head $c'$ providing an end bearing for said spring, as will be understood. The outer extremity of said tubular extension $c^2$ provides a valve-seat against which the valve $e$ impinges to form an impervious joint, the said valve being preferably provided interiorly with a leather washer $e'$ to more effectually close the valve-opening or air-passage $c^3$. The valve $e$ is of a cylindrical and cap-like form, extending nearly to the head $c$ to inclose the spring $d$ and at its outer end being closed and provided with a reduced pin-like extension $e^2$, which may be and preferably is formed integral with said valve. The said pin-like extension projects outwardly through a perforation $b^2$ in the reduced portion of the plug $b$ and at its extremity lies near the outer extremity of the said plug, where it engages or is adapted to engage the cap or cover $f$. The outer end of the plug is recessed, as at $f'$, the walls of the recess being provided with threads into which the threaded end of the cap or cover enters, the said cap being provided outside of its threaded portion with an annular recess $f^2$ to receive the edge of the plug $b$, as will be understood. I prefer to form in the plug or cap an annular recess $g$ to receive a leather washer $g'$, against which the extremity of the cylinder impinges to form a more perfectly impervious joint. A little back from the closed end of the valve $e$ I have provided air passages or openings $h$ to allow an inflow of air from the said cylinder to and through the valve-seat when the valve is opened. The parts are so disposed with relation to one another that when the cap $f$ is closed by turning its threaded end into the correspondingly-threaded end of the plug the central part of said cap or cover $f$ will engage the extremity of the pin-like extension $e^2$ of the valve, causing said valve to slide or move inward and finally causing the interior wall of the closed end of the said valve or the leather washer lying against the same to positively engage the valve-seat at the extremity of the reduced extension $c^2$, thus closing all communication between the outside atmosphere and the interior of the inner end of the valve-cylinder. Upon the removal of the cap or cover $f$ the spring $d$, pressing against the inner side of the closed end of the valve, forces the valve outward, so that the washer $e'$ is forced away from the valve-seat $c$, permitting an inflow of air from the usual pump to the tire. The bore of the passage $c^3$ is made of a cross-sectional area not greater than that of the perforation $b^2$ when the extension $e^2$ is therein, so that both inlet and outlet of the cylinder $a$ are substantially of the same capacity. This is necessary to prevent too unequal pressure on the opposite sides of the valve $e$ when air is forced in, whereby the valve might be forced against the end of the tubular extension $c^2$ to close the exit. The construction described preserves substantially equal pressure on both sides of the valve $e$ and prevents undue movement. Before the cap is entirely removed from the plug, so as to permit a free escape of air, the outer end of the valve engages the inner end of the plug, thus closing communication from the interior of the cylinder $a$ through the central perforation in the plug to the exterior atmosphere, and thus preventing an escape of the compressed air within the tire. This engagement of the said valve with the inner end of the plug is occasioned by the spring $d$ automatically, and the joint between the valve and said inner end of the plug is rendered more impervious by the washer $e^3$.

By the construction thus described it will be noted that the interior valve-passages for the inflowing air are thoroughly protected against clogging from dust, &c., and it may further be noted that the spring $d$, employed for producing the automatic operations referred to, is also protected from interference or obstruction.

Inasmuch as the valve $e$ is made to fit the interior of the cylinder more or less closely I prefer to slot or groove the periphery of said valve, as shown at $e^4$ in Fig. 5, to permit greater freedom of access of air to the valve-passage through said valve, as will be understood.

Having thus described the invention, what I claim as new is—

1. In a valve, the combination with the cylinder $a$, plug $b$, a cap $f$, of a tubular valve $e$, having a closed end with an extension adapted to pass through said plug into engagement with said cap, a valve-seat within said tubular valve and a spring engaging said valve to effect an engagement of said valve and plug, substantially as set forth.

2. The combination in a valve, of the cylinder, plug, and cap, a cylindrical valve adapted to engage the plug and cap, a spring arranged in said valve, and a valve-seat within the cylinder and cylindrical valve, substantially as set forth.

3. The combination in a valve, of a cylinder $a$, threaded at one end and at or near the other end having a valve-seat $c$ with a head $c'$, formed within or integral with said cylinder and having an extension $c^2$, extending outwardly through the middle of said cylinder, a spring arranged on said extension, a valve having a cylindrical portion and a pin-like forward extension, a plug closing the end of said cylinder and having a perforation therethrough to receive the said pin-like extension, and a cap or closure for the end of the plug adapted to engage the extremity of the pin-like extension, all said parts being arranged and combined substantially as set forth.

4. The combination with the cylinder having an inner valve-seat and a perforated closed outer end, of a valve adapted to engage said valve-seat at one limit of its range of movement and to close the passage at the outer end of the cylinder at its other limit of movement, and a spring normally holding said valve in its outer position, substantially as set forth.

5. The combination with the cylinder $a$, having threads $a'$, and valve-seat $c$, having an extension $c^2$, with air-passages $c^3$, therethrough and a cylindrical valve, arranged over or around said extension and having a closed end with a pin-like extension, washers $e'$, $e^3$, on the inner and outer sides of said closed end, and a cap or closure adapted to engage the extremity of the extension to close the valve against the valve-seat and a spring to close the valve against the closure of the cylinder, substantially as set forth.

6. In a valve, the combination with an outer cylinder of a cylindrical valve open at one end, a tubular valve-seat extending into said valve and adapted to form at its extremity an impervious joint with the valve when said valve is seated; and a spring coiled around said tubular valve-seat and tending to unseat the valve, substantially as set forth.

7. The combination with the cylinder and plug forming an outward passage and at its interior end a valve-seat, of a second valve-seat at the opposite end of the cylinder, a valve working between said two seats and having a pin-like extension projecting through said outward passage in the plug, a spring forcing said valve toward the plug, and a cap for the cylinder adapted to engage said valve extension and force the valve inward, substantially as set forth.

In testimony that I claim the foregoing I have hereunto set my hand this 31st day of August, 1898.

DANIEL B. CAMP.

Witnesses:
CHARLES H. PELL,
RUSSELL M. EVERETT.